March 2, 1965  H. L. McCOMBS, JR  3,171,330
MOTION TRANSMITTING SYSTEM
Filed May 18, 1962

INVENTOR.
HOWARD L. McCOMBS, JR.
BY
William S. Thompson
AGENT

United States Patent Office 3,171,330
Patented Mar. 2, 1965

3,171,330
MOTION TRANSMITTING SYSTEM
Howard L. McCombs, Jr., South Bend, Ind., assignor to The Bendix Corporation, South Bend, Ind., a corporation of Delaware
Filed May 18, 1962, Ser. No. 195,752
6 Claims. (Cl. 91—385)

The present invention relates to motion transmitting system of the hydromechanical type having transmitting and receiving units and fully hydraulic connections therebetween and means for locking the receiver output motion synchronously with transmitter input motion to insure the desired relationship between input and output motions are maintained.

It is often desired to transmit motion between two remote points by hydraulic pressure line connections which have the ability to follow an irregular path and have high reliability. In these respects, the hydraulic connection is superior to both mechanical and electrical type connections. However, fluid pressure motion transmitting devices are susceptible to variations in a control fluid pressure, dirt and other air inducing factors.

Accordingly, it is an object of the present invention to provide a motion transmitting system having fully hydraulic connections between transmitters and receivers and which is insensitive to variations in supply fluid pressure.

It is another object of the present invention to provide a motion transmitter having a readily adjustable relationship between input to output travel or gain which does not require disassembly or replacement of parts.

It is a still further object of the present invention to provide a hydraulic motion transmitter insensitive to temperature variations in the surrounding environment or operative hydraulic fluids.

It is another object of the present invention to provide a motion transmitter of an improved design having high accuracy and reliability.

Figure 1:
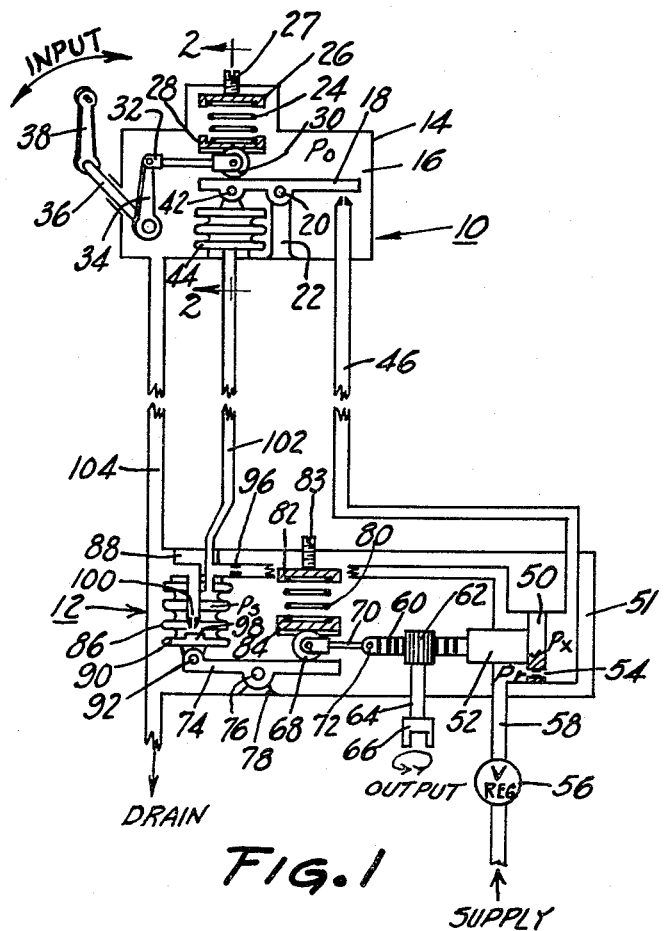
Figure 2:
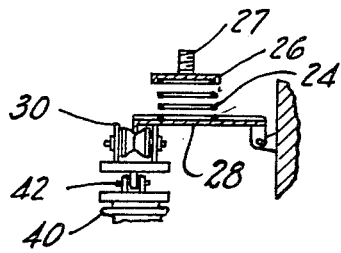

Other objects and advantages of the present invention will become apparent on consideration of the attached specification wherein a preferred form of my invention is described in connection with the drawings wherein:

FIGURE 1 is a schematic view of my motion transmitting apparatus; and
FIGURE 2 is a section view taken along line 2—2 of FIGURE 1.

Referring to the drawing, my motion transmitting system consists of a transmitter subcomponent generally indicated by numeral 10 and the receiver subcomponent by numeral 12 interconnected by hydraulic lines.

Transmitter 10 consists of a housing 14 having a hollow interior defining a fluid chamber 16 which contains a balance beam 18 pivotably secured at 20 to fixed projection 22 of housing 14. A first force-moment tending to rotate beam 18 in a counterclockwise direction is applied by a spring 24 contained between fixed retainer 26 and movable retainer 28 through a roller or movable fulcrum member 30 to the upper surface of beam 18. Fixed retainer 26 includes an externally extending adjustment screw 27 which threadedly engages housing 14. Movable retainer 28 is pivotably mounted about an axis at one edge of the retainer and parallel to beam 18. This pivot is best shown in FIGURE 2. The first force-moment applied by spring 24 may be varied by moving roller 30 horizontally from a position illustrated thus varying the distance between the point of application of the force from spring 24 to the pivot 20 and thereby varying the force-moment. A link 32 for positioning roller 30 is connected to a bell crank 34 having a shaft 36 extending externally from the housing 14 where there is secured a second bell crank 38 which is adapted to receive an input motion. A second force-moment tending to move beam 18 in a clockwise direction is applied by the bellows 40 pinned to beam 18 at 42 and having a fixed pin secured to housing 14. This second force-moment is a function of the fluid pressures acting on bellows 40 which may be termed feedback fluid pressure and will be later described in detail. The opposing first and second force-moments acting on beam 18 control its position relative to a servo orifice 44 formed as part of the servo conduit 46 projecting through housing 14. Thus balance beam 18 provides the additional function of acting as a servo control valve operative to control the fluid pressure in conduit 46 in response to the relative proximity of beam 18 and orifice 44.

Conduit 46 is connected at its opposite end to a cylindrical chamber 50 formed within the housing 51 of the remotely located receiver device 12. A differential area piston member 52 is slidably disposed in chamber 50 and includes a restrictive bleed 54 connecting opposed piston sides. A high pressure regulated control fluid, designated $P_R$, is supplied by regulator valve 56 from a source, not shown, through conduit 58 to the left side of piston 52 where it acts over the smaller side of said piston urging it to the right. Fluid additionally passes through restriction 54 to the right side of piston 52 and is controlled in value by the movement of beam 18 relative to servo orifice 44 in transmitter 10. The variable pressure within conduit 46 and on the right side of piston 52 is designated $P_X$ pressure and is operative to urge piston 52 to the left. It will be noted that for a given value of pressure $P_R$ there will be one value of pressure $P_X$ which will cause a force balance across piston 52 and this value of $P_X$ pressure may be termed its "null" value or balancing value. Should $P_X$ pressure increase above this value due to movement of beam 18, piston 52 will move to the left, and, if $P_X$ should decrease below its null value due to movement of balance beam 18, piston 52 will move to the right.

A rack member 60 is secured to the left end of piston 52 for movement therewith and engages a pinion 62 of an output member comprised of shaft 64 and bracket connection 66 which extends externally of the transmitter housing 51. The output bracket 66 is adapted to position any desired output member. A roller or movable fulcrum 68 is connected by link 70 to the end of rack 68 where it is pinned at 72 so that roller 68 must move axially with rack 60, however, it is free to move in an arc about the pin 72.

Receiver 12 includes a pressure regulator comprised of a feedback balance beam 74 pivotably secured at 76 by projection 78 of housing 51. A regulator input forcemoment is supplied to balance beam 74 by roller 68 and reference spring 80 confined between the fixed retainer 82 and movable retainer 84 which bears against the top surface of roller 68. Fixed retainer 82 has a threaded adjusting stem 83 extending externally of housing 51. Movable retainer 84 is pivoted about one edge parallel to beam 74 similarly to the transmitter movable retainer 28 as shown in FIGURE 2. As piston 52 moves and it positions roller 68 longitudinally across the surface of balance beam 74 varying the distance between the point of application of the force from spring 80 to the pivot point 76 thus varying the force-moment on said balance beam in proportion to the movement of the piston 52. A restoring force-moment is applied to balance beam 74 by the bellows 86 which is anchored by the fixed bracket 88 to the interior of housing 51 and has a movable end 90 pinned at 92 to the balance beam 74. $P_R$ fluid pressure from the left side of piston 52 is transmitted through branch conduit 94 and fixed restriction 96 into the interior of the bellows 86 wherein it acts to provide a force on the movable end of said bellows which is transmitted through to balance beam 74. The fluid pressure within bellows 86 is designated $P_S$ and is controlled by the relative movement between an abutment 98 formed on the interior side of the end wall 90 of bellows 86 and a fixed servo orifice 100 extending within bellows 86. $P_S$ fluid pressure is also transmitted via conduit 102 back to the transmitter unit 10 where it is applied interiorly to the feedback bellows 40 to provide the feedback force moment for balance beam 18. The interior casings of transmitter and receiver devices may be jointly connected such as by conduit 104 and connected to a common drain indicated as pressure $P_O$ or may if desired be separately connected to low pressure reservoirs.

Operation

In operation an input motion is applied to bell crank 38 which moves the roller 30 changing the moment arm distance of the input force moment balance beam 18 thus changing the position of said balance beam and changing the fluid pressure within conduit 46 from its null value thus inducting movement of piston 52 within the receiver unit. As piston 52 is moved it drives output member 66 and simultaneously sets the reference force-moment to a servo presure regulator device by positioning the roller 68. The regular device comprised of bellows 86 and servo orifice 100 will operate to control a feedback servo pressure $P_S$ directly proportional to the input force-moment supplied by piston 52 in order to re-establish a force-moment balance on balance beam 74. This feedback fluid pressure $P_S$ is transmitted back to the transmitter unit where it acts on the feedback bellows 40 to supply the restoring force which repositions balance beam 18 back to its null position.

One of the more important features of the present invention is the use of a pressure regulator device rather than a device for simply scheduling a feedback pressure since it thereby renders my device free from inaccuracies due to pressure fluctuations of the supply pressure $P_R$. For example should $P_R$ change due to limitations within the valve regulator 56 or other supply devices, it would cause only a momentary change in pressure $P_S$. For as soon as $P_S$ is changed, it would reposition the balance beam 74 and restore itself to its former value which is dependent not on $P_R$ pressure but on the input force moments supplied by spring 80 and roller 68. Therefore in operation the output member 66 is in effect synchronously locked on the input roller 30 since the two units must move together or $P_S$ will not obtain the restoring value needed to re-establish balance on input balance beam 18.

Variation in the proportionality or gain from the input motion of bell crank 38 to output motion bracket 66 may be accomplished by non-uniform relative adjustments to screws 27 and 83 of the transmitter and receiver units respectively. For example, if the unit were set to have a 1:1 relationship between input and output motions and it was desired to change this to a 1:2 relationship this could be easily accomplished either by screwing in on screw 27 of the transmitter unit to compress spring 24 to the point where it applied twice the load to roller 30 or to back out screw 83 of the receiver element to elongate spring 80 to the point where it would apply half its former load to roller 68. This change could also be made by partial adjustments in opposite directions on both adjustment screws. System gain or output/input travel ratio is directly proportional to $F_s 80/F_s 24$ where $F_s$ 80 is the force of spring 80 on roller 68 and $F_s 24$ is the force of spring 24 on roller 30.

Another feature of my motion transmitter is the ability to readily adjust the pressure range of operation. For example, should $P_R$ pressure change due to deterioration or replacement of the regulator valve 56 or any other cause so that $P_R$ was half its former value, this change may restrict the range of variation of $P_S$ to the point where it would be incapable of reaching pressure levels high enough to balance high input force moments on beam 18. This condition may be quickly remedied by backing off uniformly on both adjustments 27 and 83 which reduces the required pressure range of $P_S$. The adjustment should be uniform to maintain the same system gain. Best accuracy will be obtained by utilizing the highest system pressures available within the limitations of the supply pressure $P_R$.

In summary it may be observed that uniform adjustments on screws 27 and 83 will adjust the pressure range of operation and non-uniform adjustments will vary the gain. These adjustments may be made separately or simultaneously. If springs 24 and 80 are of different size and have different rates the relative degree of adjustment required will be altered in proportion to the rate ratio, however, the principles of adjustment described above remain applicable.

It is well known that the preload produced by a spring will vary with the surrounding temperature, which temperature change will cause a growth or contraction of the spring altering the force applied. In a servo system where a spring is used to produce a reference force, this temperature induced change would cause a system error. In the present device temperature error may be avoided by constructing both springs 24 and 80 of the same material so that temperature changes, in this case of $P_O$ fluid, will equally effect both springs. This change then becomes analogous to a uniform adjustment to screws 27 and 83 and changes merely the pressure range of operation and has no effect on the position of the output member or gain of the device. If transmitter 10 and receiver 12 are so far from one another that a temperature gradient between the two units can exist, temperature compensating bimetal discs may be added in series with springs 24 and 80 to componesate for the gradient.

Although only one embodiment of my invention has been illustrated and described, it will be readily apparent to those skilled in the art that various changes in the structure and relative arrangement of parts may be made to suit individual requirements without departing from the scope and spirit of the present invention.

I claim:

1. A motion transmitting system comprising: a movable input member, an input balance beam operatively connected to said input member to receive a first force-moment therefrom that varies with movement of said input member, a feedback pressure responsive member connected to said input balance beam for supplying a second force-moment thereto in opposition to said first force-moment, a remotely spaced output member, a servomotor connected to said output member for controlling the movement thereof, fluid control means interconnecting said servomotor and said input balance beam so that said servomotor is positioned in response to movement of said input balance beam, a pivoted feedback balance beam, spring means producing a reference force, a movable fulcrum intermediate said spring means and said feedback balance beam to control the point of application of said reference force, link means interconnecting said movable fulcrum to said servomotor for movement therewith, a fluid pressure regulator including a regulator control orifice and regulater pressure responsive member both connected to said feedback balance beam to regulate a feedback fluid pressure proportional to the force-moment applied by said movable fulcrum, and conduit means operative to transmit said feedback fluid pressure to said feeback pressure responsive member to determine the magnitude of said second force-moment acting on said input balance beam.

2. A motion transmitting system comprising: a transmitter device operative to control a servo fluid pressure in response to the error between an input and feedback signal, said transmitter device including a pressure responsive feedback member, a receiver device remotely spaced from said transmitter device and including a servomotor responsive in position to said servo fluid pressure from said transmitter device, an output member driven by said servomotor, said receiver device including a movable balance beam and control orifice relatively movable to regulate a feedback fluid pressure, a regulator pressure responsive member responsive to said feedback fluid pressure and connected to said movable balance beam to apply a restoring force thereto, a movable roller member connected to said servomotor and in contact with said balance beam, a spring member contacting said roller member to apply a force therethrough to said balance beam and thereby provide a reference force-moment to said balance beam, and a fluid pressure connection operative to transmit said feedback fluid pressure from said receiver device to said pressure responsive feedback member within said transmitter device.

3. A motion transmitting system comprising: a transmitter device including, a first pivoted balance beam member movable to control a servo fluid pressure, a first spring member operative to produce a first constant reference force, a first movable fulcrum member intermediate said first spring and said first balance beam movable to vary the moment arm said first constant reference force is applied to said first balance beam, a movable input member connected to said first variable fulcrum to position said fulcrum in response to movement of said input member, a feedback pressure responsive member connected to said first balance beam at a fixed point along the length thereof; a receiver device remotely spaced from said transmitter device including, a servomotor having a fluid connection with said transmitter device and responsive to the servo fluid pressure controlled by said first balance beam, an output member connected to said servomotor and driven thereby, a second pivoted balance beam member, pressure regulating means connected to said second balance beam operative to regulate feedback fluid pressure proportional to a regulator force applied by said second balance beam, a second spring member operative to produce a second constant reference force, a second movable fulcrum member positioned intermediate said second spring and said second balance beam vary the moment arm of said second constant reference force on said second balance beam and thereby determine the regulator force controlling said pressure regulating means, means interconnecting said second fulcrum to said servomotor; and conduit means interconnecting the pressure regulating means of said receiver device to the feedback pressure responsive member of said transmitter to supply said feedback fluid pressure thereto.

4. A motion transmitter system as claim in claim 3 including adjustable means operative with said first and second springs selectably adjustable to vary system gain and operative pressure level.

5. A motion transmitter system as claimed in claim 4 wherein said adjustable means comprises a pair of adjustable retainers one operative with each of said first and second springs to adjust the preload thereof, said adjustable retainers operative to vary system gain when non-uniformly adjusted and to vary system pressure level when uniformly adjusted.

6. A motion transmitter system as claimed in claim 3 wherein said first and second springs are constructed of the same material to provide uniform and offsetting load changes due to environmental temperature variations.

References Cited in the file of this patent
UNITED STATES PATENTS

| | | |
|---|---|---|
| 2,401,680 | Eaton | June 4, 1946 |
| 2,575,085 | Alyea | Nov. 13, 1951 |
| 2,910,084 | Frantz | Oct. 27, 1959 |
| 2,911,991 | Pearl | Nov. 10, 1959 |
| 2,970,476 | Cary | Feb. 17, 1961 |
| 2,972,443 | Watrous | Feb. 21, 1961 |
| 2,980,070 | Mrvosh | Apr. 18, 1961 |
| 3,079,074 | Jordan | Feb. 26, 1963 |